(12) United States Patent
Shin et al.

(10) Patent No.: US 12,711,592 B2
(45) Date of Patent: Aug. 18, 2026

(54) SYSTEM FOR PERFORMING VIRTUAL IMAGE QUALITY ASSESSMENT OF IMAGE DATA BASED ON DIGITAL TWIN AND OPERATING METHOD THEREOF

(71) Applicant: Samsung Electronics Co., Ltd., Suwon-si (KR)

(72) Inventors: Jeong Yong Shin, Suwon-si (KR); Sangmin Kim, Suwon-si (KR); Jintae Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 18/451,258

(22) Filed: Aug. 17, 2023

(65) Prior Publication Data

US 2024/0221137 A1 Jul. 4, 2024

(30) Foreign Application Priority Data

Dec. 30, 2022 (KR) ........................ 10-2022-0190449

(51) Int. Cl.
*G06T 7/00* (2017.01)
*G06T 11/26* (2026.01)
*G06T 17/00* (2006.01)

(52) U.S. Cl.
CPC ............ *G06T 7/0002* (2013.01); *G06T 11/26* (2026.01); *G06T 17/00* (2013.01); *G06T 2207/30168* (2013.01)

(58) Field of Classification Search
None
See application file for complete search history.

(56) References Cited

U.S. PATENT DOCUMENTS 9,875,580 B2 1/2018 Cannon et al.
11,094,125 B2 8/2021 Wang
11,341,508 B2 5/2022 Mercury et al.
2009/0322887 A1* 12/2009 Kim ........................ H04N 17/04 348/189
2011/0054872 A1* 3/2011 Chen ........................ G06F 30/20 703/13
2020/0012756 A1* 1/2020 Ma .......................... G06F 30/20
2020/0041258 A1* 2/2020 Wang ....................... G06T 7/521
2021/0318673 A1 10/2021 Kitchen et al.
2022/0021903 A1 1/2022 Miyazawa et al.
2022/0132205 A1 4/2022 Koike et al.
2022/0343767 A1* 10/2022 Galindo ................. G05D 1/101
2023/0281954 A1* 9/2023 Grau ....................... G06T 11/00 382/104
2024/0176930 A1* 5/2024 Smith ..................... G06F 30/23

FOREIGN PATENT DOCUMENTS

JP 7042561 B2 3/2022

* cited by examiner

*Primary Examiner* — Sarah Le
(74) *Attorney, Agent, or Firm* — Wolf, Greenfield & Sacks, P.C.

(57) ABSTRACT

Disclosed is a virtual image quality assessment system that includes an electronic device configured to receive simulation condition data based on a user input, perform an optical simulation based on the simulation condition data, perform a sensor simulation based on the simulation condition data and a result of the optical simulation, and generate raw image data based on a result of the sensor simulation.

20 Claims, 7 Drawing Sheets

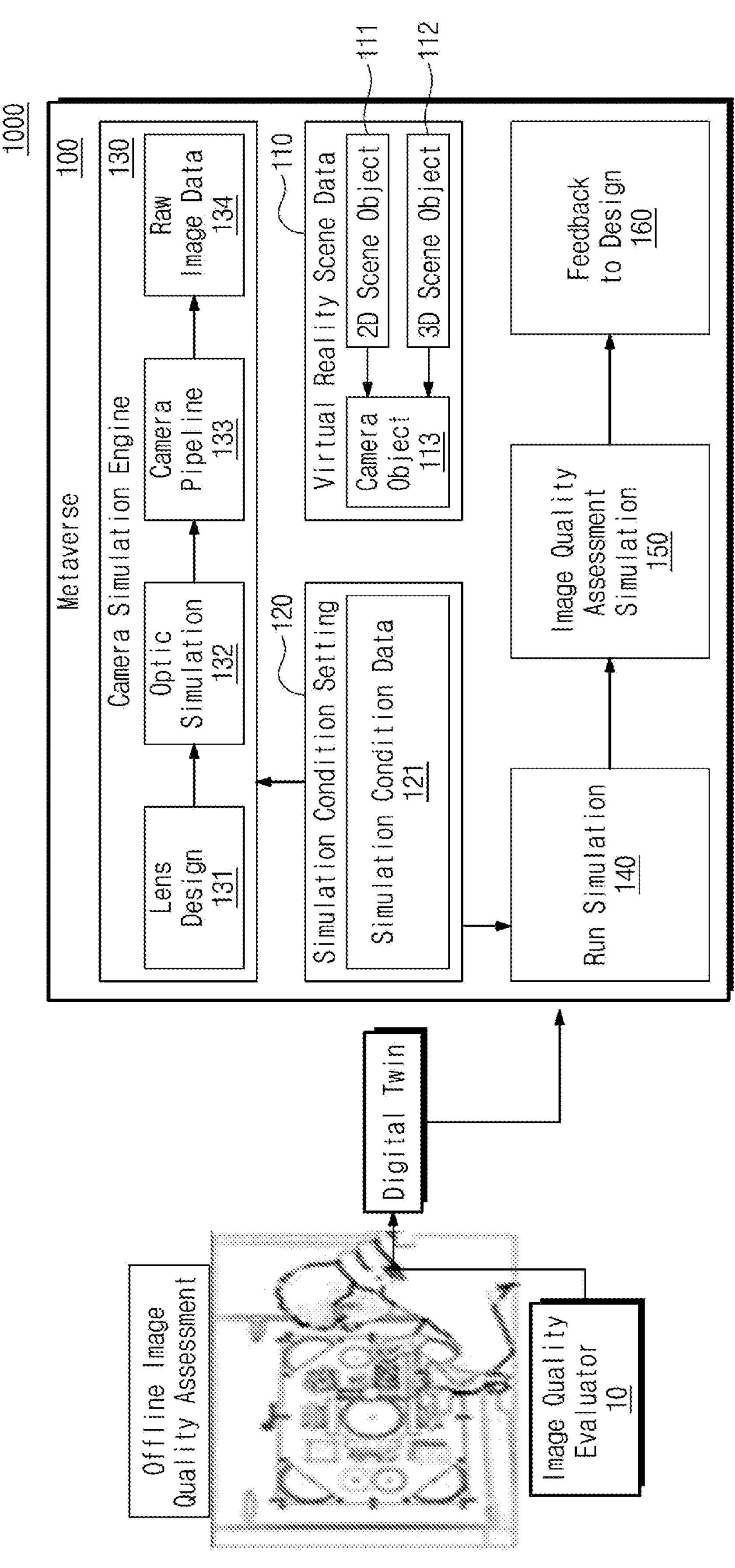
FIG. 1
1000
Metaverse
100
Camera Simulation Engine
130
Lens Design 131
Optic Simulation 132
Camera Pipeline 133
Raw Image Data 134
Simulation Condition Setting
120
Simulation Condition Data 121
Virtual Reality Scene Data
110
2D Scene Object
111
3D Scene Object
112
Camera Object 113
Run Simulation 140
Image Quality Assessment Simulation 150
Feedback to Design 160
Digital Twin
Offline Image Quality Assessment
Image Quality Evaluator 10

Second Server 30 idata

Figure 2:
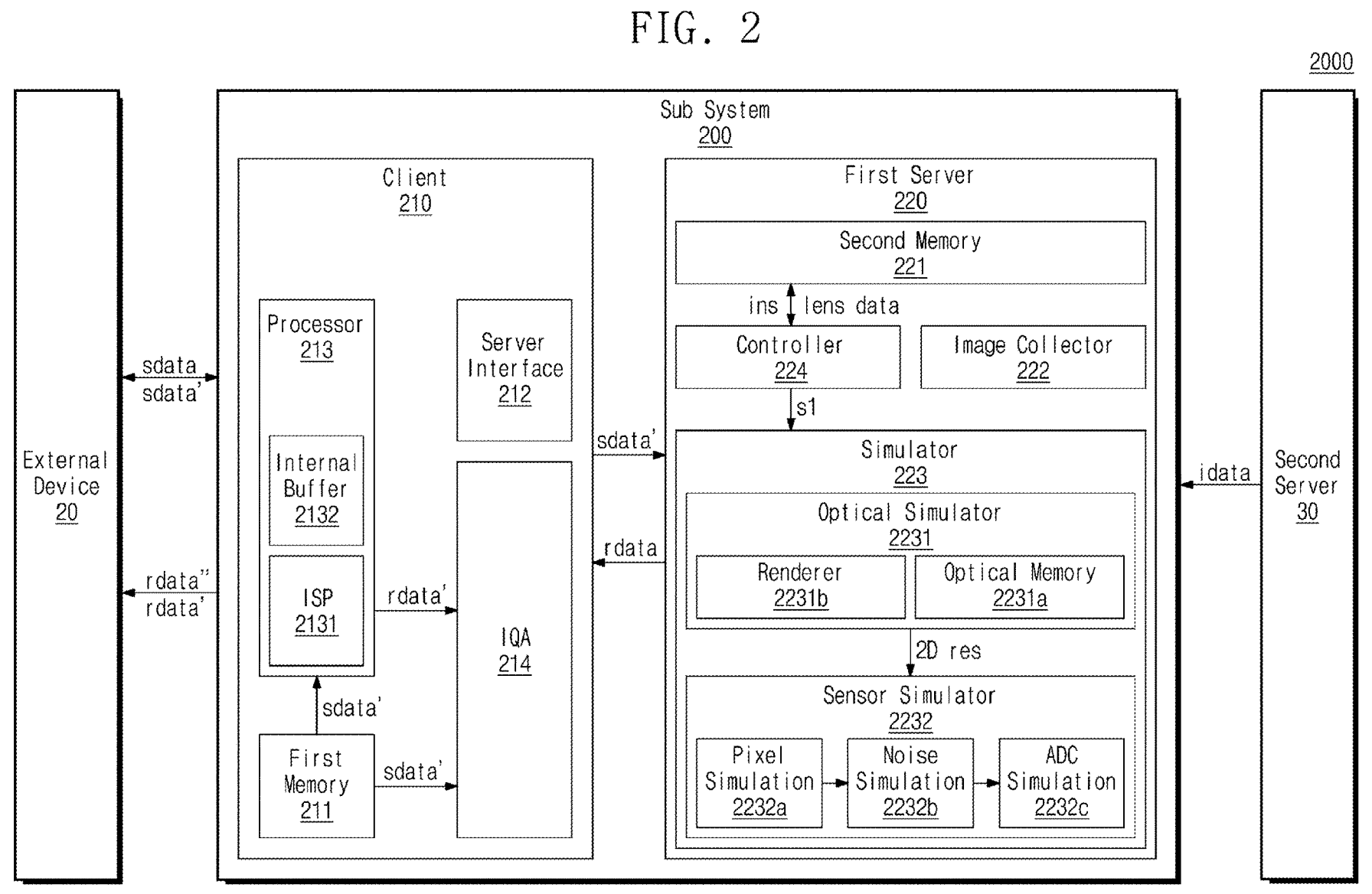

Sub System 200

First Server 220

Second Memory 221 ins lens data

Image Collector 222

Controller 224 s1

Simulator 223

Optical Simulator 2231

Optical Memory 2231a

Renderer 2231b 2D res

Sensor Simulator 2232

Pixel Simulation 2232a

Noise Simulation 2232b

ADC Simulation 2232c sdata' rdata

Client 210

Server Interface 212

IQA 214 rdata' sdata'

Processor 213

Internal Buffer 2132

ISP 2131 sdata'

First Memory 211 sdata sdata' rdata"

rdata'

External Device 20

FIG. 3

| Category | Configuration Type | | | |
|---|---|---|---|---|
| Light | Light 1 | Light 2 | ··· | Light n |
| Studio | Studio 1 | Studio 2 | ··· | Studio n |
| Scene | Scene 1 | Scene 2 | ··· | Scene n |
| Lens | Lens 1 | Lens 2 | ··· | Lens n |
| Sensor | Sensor 1 | Sensor 2 | ··· | Sensor n |
| ISP | Pro_type 1 | Pro_type 2 | ··· | Pro_type n |
| IQA | An_type 1 | An_type 2 | ··· | An_type n |

SYSTEM FOR PERFORMING VIRTUAL IMAGE QUALITY ASSESSMENT OF IMAGE DATA BASED ON DIGITAL TWIN AND OPERATING METHOD THEREOF

CROSS-REFERENCE TO RELATED APPLICATION(S)

This application claims priority under 35 U.S.C. § 119 to Korean Patent Application No. 10-2022-0190449, filed on Dec. 30, 2022, in the Korean Intellectual Property Office, the disclosure of which is incorporated by reference herein in its entirety.

BACKGROUND

Embodiments of the present disclosure described herein relate to an image quality assessment system, and more particularly, relate to a system for performing a virtual image quality assessment on image data based on a digital twin and an operating method thereof.

Digital twin technology refers to a technology of forming a physical object as a virtual model identical to a real model in a virtual space of a computer terminal and predicting a result by performing a simulation on the virtual model. Since systems that implement the digital twin technology may simulate the real model as the virtual model in the virtual space, an operation of the real model may be optimized.

Currently, an image quality assessment is performed by capturing real images or videos located in an image quality capturing laboratory using a real object camera including an image sensor and an image signal processor, which are hardware devices. In this case, it may be difficult for an image quality evaluator to select a capturing location and to prepare materials for capturing.

SUMMARY

Embodiments of the present disclosure provide a system for performing virtual image quality assessment of image data based on simulation data in which a user input is reflected and an operating method thereof.

According to some embodiments of the present disclosure, a virtual image quality assessment system includes an electronic device configured to: receive simulation condition data based on a user input, perform an optical simulation based on the simulation condition data, perform a sensor simulation based on the simulation condition data and a result of the optical simulation, and generate raw image data based on a result of the sensor simulation.

According to some embodiments of the present disclosure, a method for simulating a virtual image quality assessment with respect to a virtual reality scene includes generating, by a metaverse, simulation condition data based on a user input, performing, by the metaverse, an optical simulation based on the simulation condition data, generating, by the metaverse, raw image data by performing a sensor simulation based on the simulation condition data and a result of the optical simulation, performing, by the metaverse, an image signal processing simulation based on the simulation condition data and the raw image data, and performing, by the metaverse, an image quality assessment simulation based on the simulation condition data and image data generated as a result of the image signal processing simulation.

According to some embodiments of the present disclosure, a virtual image quality assessment system includes a metaverse configured to generate simulation condition data based on a user input, the metaverse includes an electronic device configured to: receive the simulation condition data based on the user input, perform an optical simulation and a sensor simulation based on the simulation condition data, and generate raw image data based on a result of the optical simulation and the sensor simulation, the metaverse is further configured to perform an image signal processing simulation and an image quality assessment simulation with respect to the raw image data.

BRIEF DESCRIPTION OF THE FIGURES

A brief description of each drawing is provided to facilitate a more thorough understanding of the drawings referenced in the detailed description of the present disclosure.

FIG. 1 is a diagram illustrating a virtual image quality assessment system, according to some embodiments of the present disclosure.

FIG. 2 is a diagram illustrating a detailed configuration of a simulator in a virtual image quality assessment system.

FIG. 3 is a table illustrating simulation data in detail.

DETAILED DESCRIPTION

Figure 4:
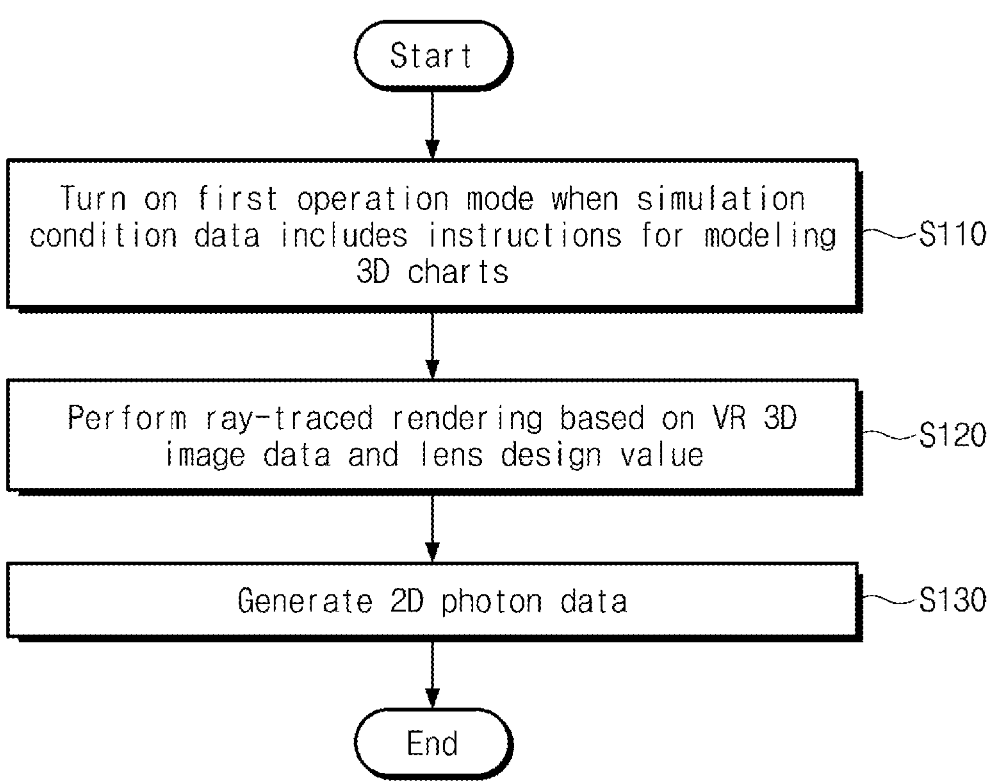
FIG. 4 is a flowchart of a detailed operation method illustrating how a first server performs an optical simulation in a first operation mode.

Hereinafter, example embodiments of the present disclosure will be described more fully with reference to the drawings, in which example embodiments are shown.

FIG. 1 is a diagram illustrating a virtual image quality assessment system 1000, according to some embodiments of the present disclosure. Referring to FIG. 1, the virtual image quality assessment system 1000 may include a metaverse 100.

In FIG. 1, an offline image quality assessment may be performed by an image quality evaluator 10. In addition, an online image quality assessment may be performed by the metaverse 100. The metaverse 100 may implement an image quality assessment performed in an offline state using a digital twin technique on an online state.

Hereinafter, in this specification, a configuration in which the metaverse 100 performs the image quality assessment on the online state will be described in detail.

The metaverse 100 may include virtual reality scene data 110, simulation condition setting 120, a camera simulation engine 130, a run simulation 140, an image quality assessment simulation 150, and a feedback to design 160.

The virtual reality scene data 110 may include a two-dimensional (2D) scene object 111, a three-dimensional (3D) scene object 112, and a camera object 113. The 2D scene object 111 may include a 2D chart, a 2D image, and 2D virtual reality scene data related to the 2D image. The 3D scene object 112 may include a 3D chart, a 3D image, and 3D virtual reality scene data related to the 3D image. The camera object 113 may configure virtual reality scene data based on one of the 2D scene object 111 or the 3D scene object 112.

The simulation condition setting 120 may include simulation condition data 121. The simulation condition data 121 may include virtual reality scene data included in the camera object 113 based on a user input. A detailed description of the configuration of the simulation condition data 121 will be described later.

The camera simulation engine 130 may include a lens design 131, an optical simulation 132, a camera pipeline 133, and raw image data 134.

The lens design 131 may include lens data based on at least one of various lens design tools (not illustrated) determined by standards. A detailed description of the lens data will be described later.

The optical simulation 132 may be performed based on the simulation condition data 121 and the lens design 131. The optical simulation 132 may be performed using different lens data included in the lens design 131 according to the configuration of virtual reality scene data included in the simulation condition data 121. A detailed description of the optical simulation 132 will be described later.

The camera pipeline 133 may perform a sensor simulation based on a result of the optical simulation 132 and the simulation condition data 121. The camera pipeline 133 may be an image sensor of a camera implemented in the metaverse 100. A detailed description of the sensor simulation will be described later.

The camera simulation engine 130 may generate the raw image data 134 as a result of sensor simulation. The raw image data 134 may refer to data output from an image sensor and not subjected to image signal processing.

The run simulation 140 may be performed based on the raw image data 134 and the simulation condition data 121. The run simulation 140 may include an image signal processing simulation. A detailed description of the run simulation 140 will be described later.

The image quality assessment simulation 150 may be performed based on the image data output as a result of the run simulation 140 and the simulation condition data 121. The image quality assessment simulation 150 may correspond to the image quality evaluator 10 in an offline image quality assessment. A detailed description of the image quality assessment simulation 150 will be described later.

The feedback to design 160 may receive a result of the image quality assessment simulation 150. A result of the image quality assessment simulation 150 may be at least one of a graph, a table, or an image. However, a result of the image quality assessment simulation 150 is not limited thereto. An image sensor with improved performance may be manufactured based on the feedback to design 160.

FIG. 2 is a diagram illustrating a detailed configuration of a simulator 223 in a virtual image quality assessment system 2000. Referring to FIG. 2, the virtual image quality assessment system 2000 may include a sub system 200, an external device 20, and a second server 30. The virtual image quality assessment system 2000 may be regarded as one system from the viewpoint of including the external device 20, the second server 30, and the sub system 200.

In FIG. 2, the sub system 200 and the second server 30 may correspond to the metaverse 100 of FIG. 1. As used herein, the second server 30 and the sub system 200 and elements included therein may be collectively referred to as the metaverse 100. In FIG. 2, the external device 20 may correspond to the image quality evaluator 10 of FIG. 1. Therefore, additional descriptions of similar components and similar operations will be omitted to avoid redundancy.

The sub system 200 may provide simulation data sdata to the external device 20. The sub system 200 may receive simulation condition data sdata' in which a user input is reflected (i.e., transmitted) from the external device 20. For example, the sub system 200 may receive simulation condition data sdata' based on a user input transmitted from the external device 20. A detailed description of the configuration of the simulation data sdata and the simulation condition data sdata' will be described later.

The external device 20 may include a virtual reality device (hereinafter referred to as a VR device), a keyboard, a mouse, and a touch pad. However, without being limited thereto, the external device 20 may further include all user interfaces capable of transmitting the simulation condition data sdata' to the sub system 200.

The sub system 200 may include a client 210 and a first server 220. The sub system 200 may be a real object camera, which is a hardware device, implemented as a camera simulation engine, which is software. The first server 220 of FIG. 2 may correspond to the camera simulation engine 130 of FIG. 1.

The client 210 may include a first memory 211, a server interface 212, a processor 213, and an image quality assessment module (hereinafter referred to as an IQA) 214. The client 210 may be an image signal processor, which is a hardware device, implemented as a simulation engine.

In FIG. 2, the first memory 211 may correspond to the simulation condition setting 120 of FIG. 1. In FIG. 2, the processor 213 may correspond to the run simulation 140 of FIG. 1. In FIG. 2, the image quality assessment module (IQA) 214 may correspond to the image quality assessment simulation 150 of FIG. 1. Therefore, additional descriptions of similar components and similar operations will be omitted to avoid redundancy.

The first memory 211 may be, but is not limited to, a dynamic random access memory (DRAM). The first memory 211 may be one of various random access memories such as a static random access memory (SRAM), a magnetic RAM (MRAM), a phase-change RAM (PRAM), a ferroelectric RAM (FRAM), and a resistive RAM (RRAM).

The first memory 211 may temporarily store the simulation data sdata. The simulation data sdata may include information about a lighting, a place, an object, a lens, a sensor, and a simulation of image signal processing. The first memory 211 may temporarily store the simulation condition data sdata'.

The server interface 212 may provide remote communication between the client 210 and other devices not included in the client 210. The server interface 212 may perform wireless or wired communication between the client 210 and the other devices not included in the client 210. The other devices may include the first server 220. A detailed description of the first server 220 will be described later.

The processor 213 may include an image signal processing (ISP) module 2131 and an internal buffer 2132. The image signal processing module (ISP) 2131 may be an image signal processor implemented as a simulation engine.

The image signal processing module (ISP) 2131 may perform an image signal processing simulation based on raw image data rdata and the simulation condition data sdata' recorded in the first memory 211.

Hereinafter, the raw image data rdata is virtual data, and is described as data obtained by virtually modeling actual raw image data on the sub system 200. The image signal processing module (ISP) 2131 may perform an image signal processing simulation of color correction, color interpolation, and bad pixel correction with respect to the raw image data rdata. A detailed description of the configuration of the raw image data rdata will be described later.

The internal buffer 2132 may store the raw image data rdata and image data rdata' generated as a result of an image signal processing simulation. The internal buffer 2132 may output the image data rdata' to the image quality assessment module (IQA) 214.

The image quality assessment module (IQA) 214 may perform an image quality assessment simulation on the image data rdata' based on the image data rdata' and the simulation condition data sdata'. The image quality assessment simulation may include assessing resolution and color sharpness of image data. However, the type of assessing the image quality of virtual image data through the image quality assessment simulation is not limited thereto.

The first server 220 may include a second memory 221, an image collector 222, the simulator 223, and a controller 224. The first server 220 may be an electronic device in which a lens and an image sensor, which are hardware devices, are implemented as a simulation engine. As used herein, the first server 220 (or the camera simulation engine 130) may also be referred to as an electronic device.

In FIG. 2, the second memory 221 may correspond to the lens design 131 of FIG. 1. In FIG. 2, the image collector 222 may correspond to the virtual reality scene data 110 of FIG. 1. In FIG. 2, the simulator 223 may correspond to the optical simulation 132 and the camera pipeline 133 of FIG. 1. Therefore, additional descriptions of similar components and similar operations will be omitted to avoid redundancy.

The second memory 221 may be, but is not limited to, a dynamic random access memory (DRAM). The second memory 221 may be one of various random access memories such as a static random access memory (SRAM), a magnetic RAM (MRAM), a phase-change RAM (PRAM), a ferroelectric RAM (FRAM), and a resistive RAM (RRAM).

The second memory 221 may temporarily store the simulation condition data sdata'. The second memory 221 may temporarily store lens data based on at least one of various lens design tools (not illustrated) determined by the standard. The lens data may include information on lens effects and lens design values. However, information included in the lens data is not limited thereto.

The image collector 222 may receive virtual image quality scene data idata from the second server 30. The virtual image quality scene data idata may be virtual data obtained by implementing images and/or videos that irregularly change with time in reality in a virtual space. Accordingly, the image collector 222 may receive information about the real model (e.g., information about a real model, a place where the real model is located, and a motion of the real model) in real time from the second server 30 as the virtual image quality scene data idata.

The virtual image quality scene data idata may include a 2D chart, a 2D image, 2D data related to the 2D image, a 3D chart, a 3D image, and 3D data related to the 3D image. However, data included in the virtual image quality scene data idata is not limited thereto and may further include n-dimensional charts, n-dimensional images, and n-dimensional data related to n-dimensional images.

The image collector 222 may receive information obtained by digitally twinning information about the real model into the virtual space as it is. Alternatively, the image collector 222 may receive information obtained by digitally twinning information about the real model into the virtual space as chart data.

The simulator 223 may include an optical simulator 2231 and a sensor simulator 2232. The optical simulator 2231 may be a lens, which is a hardware device, implemented with a simulation engine. The sensor simulator 2232 may be an image sensor, which is a hardware device, implemented with a simulation engine.

The simulator 223 may receive the virtual image quality scene data idata from the image collector 222. The simulator 223 may perform the optical simulation and the sensor simulation based on the virtual image quality scene data idata.

The optical simulator 2231 may include an optical memory 2231*a* and a renderer 2231*b*. The optical simulator 2231 may perform an optical simulation based on the simulation condition data sdata' in which a user input is reflected for a lens. For example, the optical simulator 2231 may perform an optical simulation based on the simulation condition data sdata'. The simulation condition data sdata' may be generated from a user input that corresponds to data obtained by modeling a lens with a digital twin in a virtual space.

The optical memory 2231*a* may be, but is not limited to, a dynamic random access memory (DRAM). The optical memory 2231*a* may be one of various random access memories such as a static random access memory (SRAM), a magnetic RAM (MRAM), a phase-change RAM (PRAM), a ferroelectric RAM (FRAM), and a resistive RAM (RRAM).

The optical memory 2231*a* may temporarily store the virtual image quality scene data idata. Additional descriptions of the virtual image quality scene data idata will be omitted to avoid redundancy.

The renderer 2231*b* may operate in response to a control signal s1 received from the controller 224. When a user instruction ins received by the controller 224 from the second memory 221 includes information on 3D data modeling, the renderer 2231*b* may be activated.

In this case, the renderer 2231*b* may perform ray-tracing rendering based on the simulation condition data sdata' in which the user input is reflected for a light source and a 3D scene and lens design values included in the lens data. For example, the renderer 2231*b* may perform ray-tracing rendering based on the simulation condition data sdata'. The simulation condition data sdata' may be generated from a user input that corresponds to data obtained by modeling a light source (e.g., a virtual light source), a 3D scene (e.g., a virtual reality scene), and a lens and lens design values therefrom with a digital twin in a virtual space. The renderer 2231*b* may generate 2D photon data 2D res based on a result of the ray-tracing rendering. The photon data may be data obtained by modeling the intensity of light incident on each of photodiodes of an actual image sensor in a virtual space.

When the user instruction ins received by the controller 224 from the second memory 221 includes information on 2D data modeling, the renderer 2231*b* may be deactivated.

In this case, the optical simulator 2231 may calculate a lens effect value based on the simulation condition data sdata' in which a user input is reflected for a light source and a 2D scene and a lens effect included in the lens data. For example, the optical simulator 2231 may calculate a lens effect value based on the simulation condition data sdata'. The simulation condition data sdata' may be generated from a user input that corresponds to data obtained by modeling a light source (e.g., a virtual light source), a 2D scene (e.g., a virtual reality scene), and a lens and lens effect therefrom with a digital twin in a virtual space. The optical simulator 2231 may generate the 2D photon data 2D res based on the lens effect value.

The sensor simulator 2232 may receive the 2D photon data 2D res from the optical simulator 2231. The sensor simulator 2232 may perform the sensor simulation based on the simulation condition data sdata' in which a user input is reflected for the image sensor. For example, the sensor simulator 2232 may perform the sensor simulation based on the simulation condition data sdata'. The simulation condition data sdata' may be generated from a user input that corresponds to data obtained by modeling a sensor (e.g., an image sensor) with a digital twin in a virtual space.

The sensor simulator 2232 may include a pixel simulation module 2232*a*, a noise simulation module 2232*b*, and an ADC simulation module 2232*c*.

The pixel simulation module 2232*a* may include pixel data obtained by modeling a plurality of pixels included in an actual image sensor in a virtual space. The pixel simulation module 2232*a* may include profile data of photodiodes modeling a plurality of photodiodes. The profile data may include photoelectric conversion element data.

The pixel simulation module 2232*a* may convert the 2D photon data 2D res into voltage data using photoelectric conversion element data included in each pixel data. The voltage data may be data corresponding to voltages converted from the intensity of light applied to each of the plurality of pixels of the actual image sensor.

The noise simulation module 2232*b* may model noise removal performed in an actual image sensor in a virtual space. The noise simulation module 2232*b* may perform the noise removal based on a noise simulation mode.

The noise simulation mode may include a shot noise mode, a reset noise mode, and a turn-on or turn-off noise modes. The shot noise mode may be a noise mode generated when the 2D photon data 2D res is received from the optical simulator 2231.

The reset noise mode may be a noise mode generated when the 2D photon data 2D res is converted into voltage data. Although not illustrated, the noise simulation mode may be selected based on a user input from the external device 20.

The ADC simulation module 2232*c* may model conversion of the voltage data into data bits, which is performed by an analog-to-digital converter included in the actual image sensor, in a virtual space.

The ADC simulation module 2232*c* may receive the voltage data from the pixel simulation module 2232*a* and may convert the voltage data into the data bits. For example, the data bits may be 'n' bits (e.g., 'n' is a natural number). The 'n' bits may be 8 bits or 10 bits. However, the data bits output by the ADC simulation module 2232*c* are not limited thereto.

The ADC simulation module 2232*c* may generate the raw image data rdata including data of 'n' bits (e.g., 'n' is a natural number). For example, 'n' bits may be 8 bits or 10 bits. The raw image data rdata refers to virtual data including information about a real model, but may mean data for which an image signal processing simulation is not performed.

The controller 224 may receive the simulation condition data sdata' from the second memory 221. The simulation condition data sdata' may refer to user instructions ins for a light source, a scene, a lens, and a sensor. The user instructions ins may be based on a user input from the external device 20 with respect to the light source, the scene, the lens, and the sensor. For example, the user input from the external device 20 may correspond to data obtained by modeling a light source (e.g., a virtual light source), a 2D or 3D scene (e.g., a virtual reality scene), a lens, and/or a sensor (e.g., an image sensor) with a digital twin in a virtual space.

The controller 224 may control the operation of the simulator 223 based on user instructions ins. The controller 224 may transmit the control signal s1 to the simulator 223 based on the user instruction ins.

The client 210 may receive the raw image data rdata from the first server 220 through the server interface 212. The first memory 211 may temporarily store the raw image data rdata.

The image signal processing module (ISP) 2131 may perform an image signal processing simulation operation based on the raw image data rdata and the simulation condition data sdata' with respect to image signal processing.

The processor 213 may generate the image data rdata' as a result of simulation. The client 210 may transmit the image data rdata' to the external device 20. The first memory 211 may temporarily store the image data rdata'.

The image quality assessment module (IQA) 214 may generate image quality assessment data rdata". The image quality assessment data rdata" may be generated in the form of bitmap data or image quality log data. The client 210 may transmit the image quality assessment data rdata" to the external device 20. The first memory 211 may temporarily store the image quality assessment data rdata".

FIG. 3 is a table illustrating simulation data in detail. Illustratively, in FIG. 3, a Category illustrates simulation items for a simulation operation of a virtual image quality assessment system. However, the simulation items for simulation operation are not limited thereto. The simulation condition data sdata' may be generated based on a user input corresponding to one or more of the simulation items illustrated in FIG. 3.

In FIG. 3, Configuration Type illustrates configuration types that may be selected by user input for each simulation item.

Light may denote light source data, Studio may denote studio data, Scene may denote scene data, Lens may denote lens data, Sensor may denote sensor data, ISP may denote image signal processing simulation data, and IQA may denote image quality assessment simulation data.

Referring to FIGS. 1 to 3, the simulation data sdata may include first to n-th light source data Light 1 to Light n. For example, the first light source data Light 1 may be data obtained by modeling sunlight existing in reality with a digital twin in a virtual space. The second light source data Light 2 may be data obtained by modeling a fluorescent lamp existing in a different reality from the first light source data Light 1 with a digital twin in a virtual space.

The simulation condition data sdata' may include at least one light source data in which a user input is reflected among the first to n-th light source data Light 1 to Light n. For example, the simulation condition data sdata' may include at least one light source data based on a user input that corresponds to one or more of the first to n-th light source data Light 1 to Light n. For example, the light source data may be data obtained by modeling a light source with a digital twin in a virtual space. As used herein, the first to n-th light source data Light 1 to Light n may also be referred to as virtual light source data.

The simulation data sdata may include first studio data to n-th studio data Studio 1 to Studio n. For example, the first studio data Studio 1 may be data obtained by modeling a first space existing in reality with a digital twin in a virtual space. The second studio data Studio 2 may be data obtained by modeling a second space existing in a different reality from the first studio data Studio 1 with a digital twin in a virtual space.

The simulation condition data sdata' may include at least one studio data in which a user input is reflected among the first to n-th studio data Studio 1 to Studio n. For example, the simulation condition data sdata' may include at least one studio data based on a user input that corresponds to one or more of the first to n-th studio data Studio 1 to Studio n. For example, the studio data may be data obtained by modeling a studio with a digital twin in a virtual space. Hereinafter, the simulation condition data sdata' is described to include the first studio data Studio 1.

The simulation data sdata may include first scene data to n-th scene data Scene 1 to Scene n. For example, the first scene data Scene 1 may be data obtained by modeling a 3D scene existing in reality with a digital twin in a virtual space. The second scene data Scene 2 may be data obtained by modeling a 2D scene existing in a different reality from the first scene data Scene 1 with a digital twin in a virtual space.

The simulation condition data sdata' may include at least one scene data in which a user input is reflected among the first to n-th scene data Scene 1 to Scene n. For example, the simulation condition data sdata' may include at least one scene data based on a user input that corresponds to one or more of the first to n-th scene data Scene 1 to Scene n. For example, the scene data may be data obtained by modeling a 2D or 3D scene with a digital twin in a virtual space.

The simulation data sdata may include first lens data to n-th lens data Lens 1 to Lens n. The lens data may include information about a lens type and lens specifications.

For example, the first lens data Lens 1 may be data obtained by modeling a wide-angle lens that exists in reality with a digital twin in a virtual space. The second lens data Lens 2 may be data obtained by modeling a telephoto lens existing in a different reality from the first lens data Lens 1 with a digital twin in a virtual space.

The simulation condition data sdata' may include at least one lens data in which a user input is reflected among the first to n-th lens data Lens 1 to Lens n. For example, the simulation condition data sdata' may include at least one lens data based on a user input that corresponds to one or more of the first to n-th lens data Lens 1 to Lens n. For example, the lens data may be data obtained by modeling a lens with a digital twin in a virtual space.

The simulation data sdata may include first sensor data to n-th sensor data Sensor 1 to Sensor n. The sensor data may include information about an image sensor type and specifications of the image sensor.

For example, the first sensor data Sensor 1 may be data obtained by modeling an image sensor having 50M pixels existing in reality with a digital twin in a virtual space. The second sensor data Sensor 2 may be data obtained by modeling an image sensor having 100M pixels existing in a different reality from the first sensor data Sensor 1 with a digital twin in a virtual space.

The simulation condition data sdata' may include at least one sensor data in which a user input is reflected among the first to n-th sensor data Sensor 1 to Sensor n. For example, the simulation condition data sdata' may include at least one sensor data based on a user input that corresponds to one or more of the first to n-th sensor data Sensor 1 to Sensor n. For example, the sensor data may be data obtained by modeling an image sensor with a digital twin in a virtual space.

The simulation data sdata may include first ISP data to n-th ISP data Pro_type 1 to Pro_type n. For example, the first ISP data Pro_type 1 may be data obtained by modeling a color correction operation of an actual image signal processor with a digital twin in a virtual space. The second ISP data Pro_type 2 may be data obtained by modeling a demosaicing operation of an actual image signal processor different from that of the first ISP data Pro_type 1 with a digital twin in a virtual space.

The simulation condition data sdata' may include at least one ISP data in which a user input is reflected among the first to n-th ISP data Pro_type 1 to Pro_type n. For example, the simulation condition data sdata' may include at least one ISP data based on a user input that corresponds to one or more of the first to n-th ISP data Pro_type 1 to Pro_type n. For example, the ISP data may be data obtained by modeling an operation of an actual image signal processor with a digital twin in a virtual space. As used herein, the first to n-th ISP data Pro_type 1 to Pro_type n may also be referred to as image signal processing simulation data.

The simulation data sdata may include first IQA data to n-th IQA data An_type 1 to An_type n. For example, the first IQA data An_type 1 may be data obtained by modeling a resolution assessment operation of an actual image quality evaluator with a digital twin in a virtual space. The second IQA data An_type 2 may be data obtained by modeling a color reproducibility assessment operation of an actual image quality evaluator different from that of the first IQA data An_type 1 with a digital twin in a virtual space.

The simulation condition data sdata' may include at least one IQA data in which a user input is reflected among the first to n-th IQA data An_type 1 to An_type n. For example, the simulation condition data sdata' may include at least one IQA data based on a user input that corresponds to one or more of the first to n-th IQA data An_type 1 to An_type n. For example, the IQA data may be data obtained by modeling an operation of an actual image quality evaluator with a digital twin in a virtual space. As used herein, the first to n-th IQA data An_type 1 to An_type n may also be referred to as image quality assessment simulation data.

A user input may independently exist for each of light source data, studio data, scene data, lens data, sensor data, image signal processing simulation data, and image quality assessment simulation data. For example, the simulation condition data sdata' may include the first light source data Light 1, the first studio data Studio 1, the second scene data Scene 2, the first lens data Lens 1, the first sensor data Sensor 1, the second ISP data Pro_type 2, and the second IQA data An_type 2.

The simulation items described in FIG. 3 are merely illustrative. Therefore, in addition to the embodiment of FIG. 3, the virtual image quality assessment systems 1000 and 2000 may further include simulation items to perform a simulation operation.

FIG. 4 is a flowchart of a detailed operation method illustrating how a first server performs an optical simulation in a first operation mode. Referring to FIGS. 1 to 4, in operation S110, when the simulation condition data sdata' includes 3D scene data, that is, when the user instruction ins is 3D data modeling, the first server 220 (or 130 in FIG. 1) may operate in the first operation mode.

In operation S120, the first server 220 (or 130) may perform the ray-tracing rendering based on the 3D data among the virtual image quality scene data idata and lens design values. At least one lens data included in the simulation condition data sdata' may include a lens design value.

In this case, the first server 220 (or 130) may perform the ray-tracing rendering based on at least one light source data included in the simulation condition data sdata'. A lens effect value may be measured through the ray-tracing rendering in the first server 220 (or 130).

In operation S130, the first server 220 (or 130) may generate the 2D photon data 2D res based on the optical simulation result in the first operation mode. The 2D photon data 2D res may be data obtained by implementing light incident on an image sensor in a virtual space.

Figure 5:
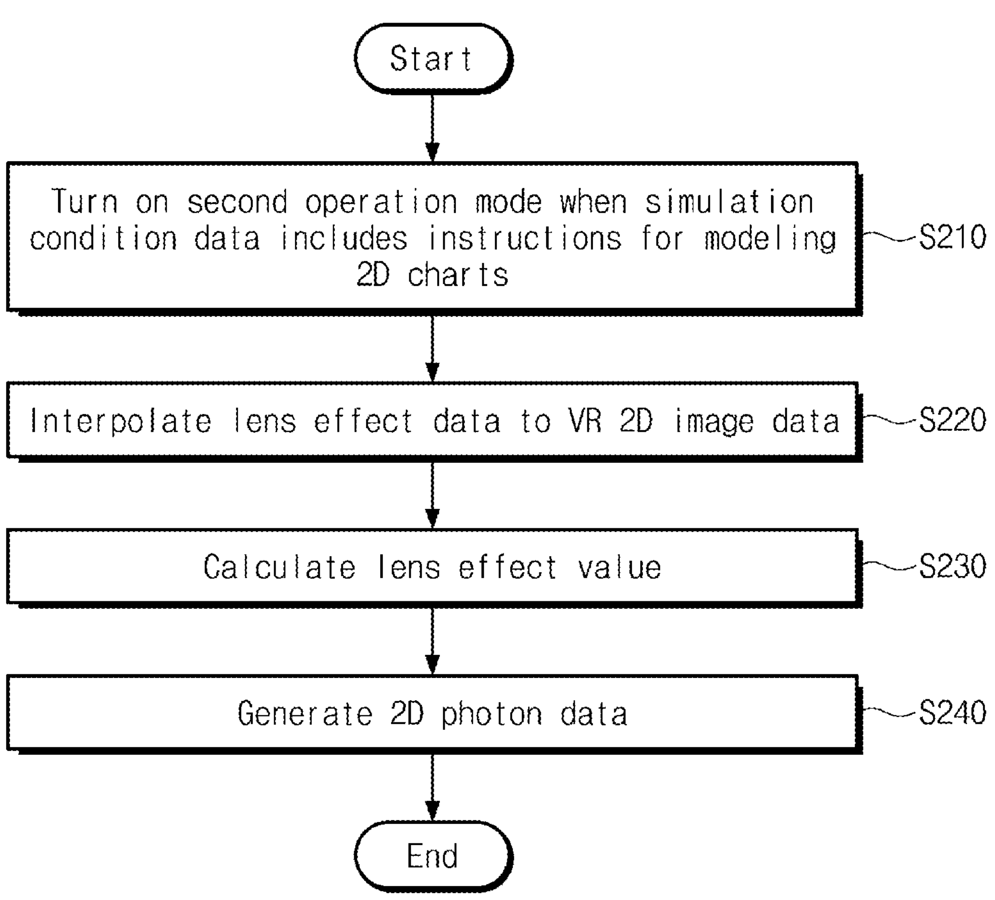
FIG. 5 is a flowchart of a detailed operation method illustrating how a first server performs an optical simulation in a second operation mode.

FIG. 5 is a flowchart of a detailed operation method illustrating how a first server performs an optical simulation in a second operation mode. Referring to FIGS. 1 to 3 and 5, in operation S210, when the simulation condition data sdata' includes 2D scene data, that is, when the user instruction ins is 2D data modeling, the first server 220 (or 130) may operate in the second operation mode.

In operation S220, the first server 220 (or 130) may interpolate lens effect data with respect to 2D data among the virtual image quality scene data idata. The lens effect data may include at least one information of a point spread function (PSF) and lens distortion.

In operation S230, the first server 220 (or 130) may calculate a lens effect value by applying the lens effect data to the 2D virtual image quality scene data. For example, the lens effect value may include a value for relative illumination (RI) of the lens.

In operation S240, the first server 220 (or 130) may generate the 2D photon data 2D res based on the optical simulation result in the second operation mode. The 2D photon data 2D res generated in the second operation mode may be the same as or different from the 2D photon data 2D res generated in the first operation mode.

Figure 6:
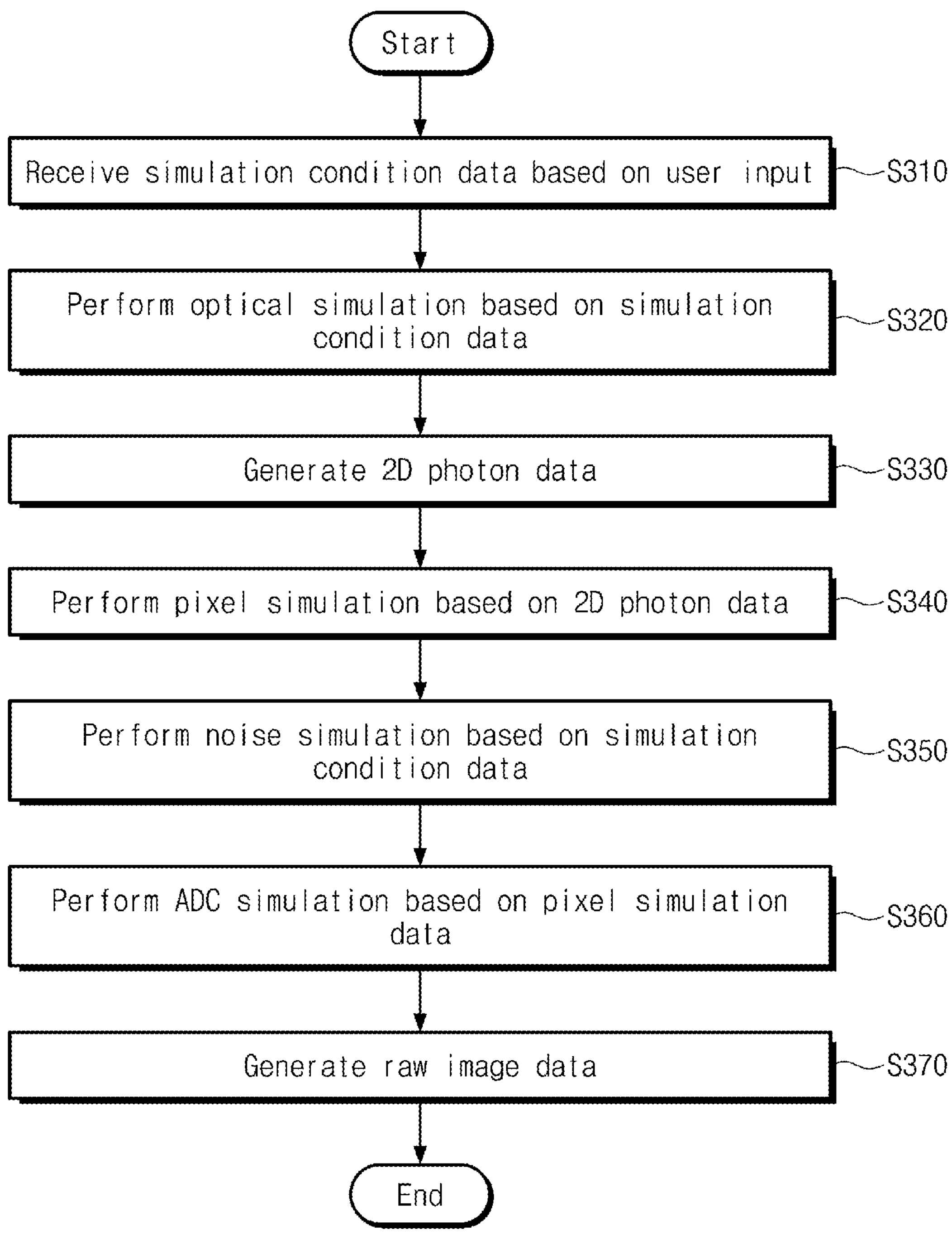
FIG. 6 is a flowchart of an operation method illustrating how a first server performs an optical simulation and a sensor simulation.

FIG. 6 is a flowchart of an operation method illustrating how a first server performs an optical simulation and a sensor simulation. Illustratively, operation S320 of FIG. 6 corresponds to operations S110 and S120 of FIG. 4 or operations S210 to S230 of FIG. 5, and operation S330 of FIG. 6 corresponds to operation S130 of FIG. 4 or operation S240 of FIG. 5. Therefore, additional description associated with similar operations will be omitted to avoid redundancy.

Referring to FIGS. 1 to 3 and 6, in operation S310, the first server 220 (or 130) may receive simulation data based on a user input from the client 210, that is, the simulation condition data sdata'. For example, the first server 220 (or 130) may receive simulation condition data sdata' from the client 210 based on a user input transmitted from the external device 20 (or 10). As described in FIG. 3, the simulation condition data sdata' may include at least one configuration type for each of the simulation items. At least one configuration type may mean the user instruction ins.

In operation S320, the first server 220 (or 130) may perform the optical simulation in the first operation mode or the second operation mode based on the user instruction ins included in the simulation condition data sdata'. For example, the first 220 server (or 130) may perform the optical simulation based on the simulation condition data sdata'. In some embodiments, the optical simulation may be performed based on a first subset of the simulation condition data sdata' that includes first input data corresponding to a virtual reality scene (e.g., corresponding to one or more of the first scene data to n-th scene data Scene 1 to Scene n). The optical simulation may include modeling the virtual reality scene. In some embodiments, the first subset of the simulation condition data sdata' may further include second input data that corresponds to a lens (e.g., that corresponds to one or more of the first to n-th lens data Lens 1 to Lens n) and third input data that corresponds to a virtual light source (e.g., that corresponds to one or more of the first to n-th light source data Light 1 to Light n). The first subset of the simulation condition data sdata' may further include the first studio data Studio 1.

In operation S330, the first server 220 (or 130) may generate the 2D photon data (i.e., photon data) 2D res based on the optical simulation result in the first operation mode or the second operation mode. The 2D photon data 2D res may include information about a lens effect value. For example, first photon data (e.g., 2D photon data 2D res) may be generated as a result of the first operation mode and second photon data (e.g., 2D photon data 2D res) may be generated as a result of the second operation mode. The first photon data may be the same as or different from the second photon data. In some embodiments, when the first input data is 3D data, the first server 220 (or 130) may operate in the first operation mode that includes modeling the virtual reality scene in three dimensions based on the second input data, the third input data, and a lens design value (e.g., included in the second input data that corresponds to one or more of the first to n-th lens data Lens 1 to Lens n). In some embodiments, when the first input data is 2D data, the first server 220 (or 130) may operate in the second operation mode that includes modeling the virtual reality scene in two dimensions based on the second input data, the third input data, and lens effect data (e.g., included in the second input data that corresponds to one or more of the first to n-th lens data Lens 1 to Lens n).

In operation S340, the first server 220 (or 130) may perform a pixel simulation based on the 2D photon data 2D res. The pixel simulation may be performed based on the simulation condition data sdata'.

In this case, the simulation condition data sdata' may include a user input with respect to the pixel data size. The pixel data size may be one of 12.5 Mp or 50 Mp. However, the pixel data size is not limited thereto.

In operation S350, the first server 220 (or 130) may selectively perform noise simulation based on the simulation condition data sdata'. The simulation condition data sdata' may include a user input with respect to the noise simulation mode.

The simulation condition data sdata' may include one of a shot noise mode, a reset noise mode, or a turn-on or turn-off noise modes. However, the noise mode is not limited thereto.

In operation S360, the first server 220 (or 130) may perform ADC simulation based on the pixel simulation data. The pixel simulation data may be voltage data.

The ADC simulation may be performed based on pixel simulation data from which noise data is removed according to a noise simulation mode included in the simulation condition data sdata'.

For example, when the shot noise mode is included in the simulation condition data sdata', the ADC simulation may be performed based on the pixel simulation data from which noise data generated when the 2D photon data 2D res is received in the first server 220 (or 130) is removed.

When the reset noise mode is included in the simulation condition data sdata', the ADC simulation may be performed based on pixel simulation data from which noise data generated when the 2D photon data 2D res is converted into voltage data in the first server 220 (or 130) is removed.

The first server 220 (or 130) may perform a sensor simulation based on the simulation condition data sdata' and a result of the optical simulation (e.g., the 2D photon data 2D res). In some embodiments, the sensor simulation may be performed based on the result of the optical simulation and a second subset of the simulation condition data sdata', and the second subset may include fourth input data that corresponds to a sensor (e.g., that corresponds to one or more of the first to n-th sensor data Sensor 1 to Sensor n). In some embodiments, the sensor simulation may include generating the raw image data rdata by performing the pixel simulation, the noise simulation, and the ADC simulation (i.e., a digital signal output simulation) based on the fourth input data and 2D photon data 2D res generated as a result of one of the first operation mode or the second operation mode.

In operation S370, the first server 220 (or 130) may generate the raw image data rdata based on results of the optical simulation and the sensor simulation. The first server 220 (or 130) may transmit the generated raw image data rdata to the client 210.

Figure 7:
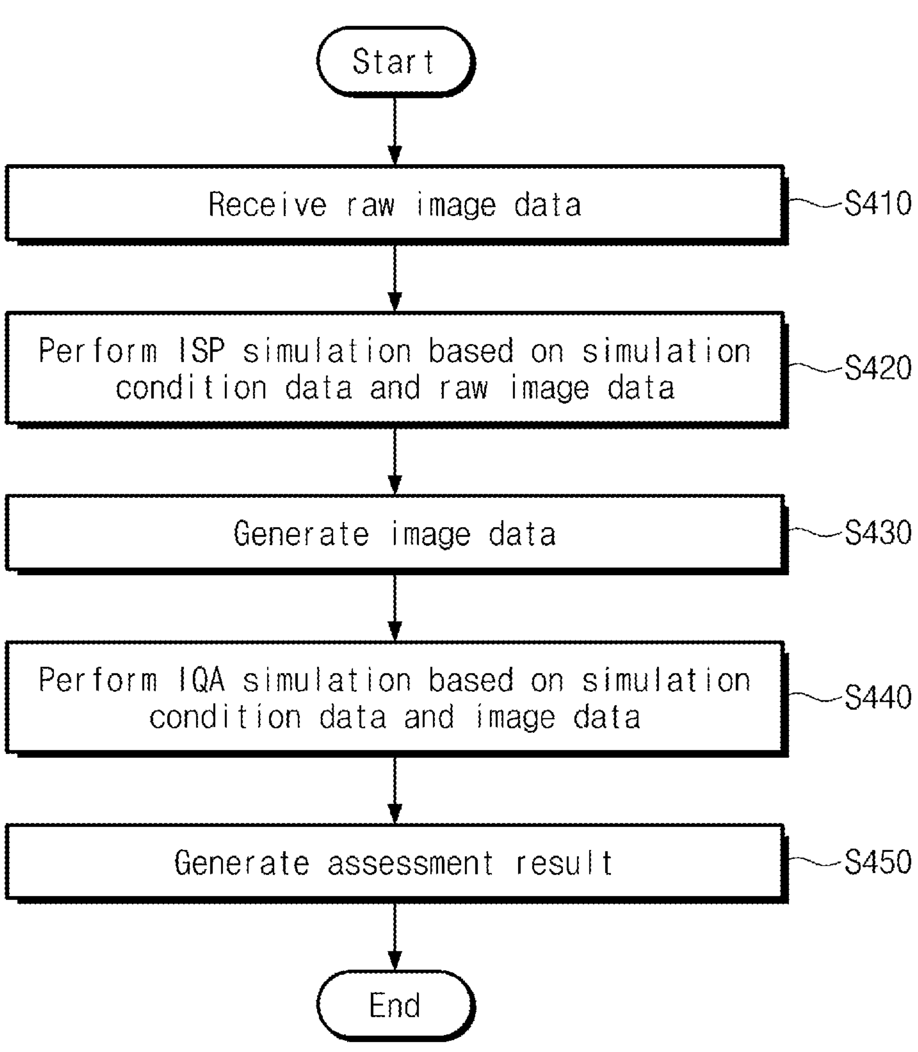
FIG. 7 is a flowchart of an operation method illustrating how a client performs an image signal processing simulation and an image quality assessment simulation.

FIG. 7 is a flowchart of an operation method illustrating how a client performs an image signal processing simulation and an image quality assessment simulation. Referring to FIGS. 1 to 3 and 7, in operation S410, the client 210 may receive raw image data rdata from the first server 220 (or 130).

In operation S420, the client 210 may perform an image signal processing (ISP) simulation operation based on the raw image data and the simulation condition data sdata' in which a user input is reflected. In some embodiments, the image signal processing simulation may be performed based on the raw image data rdata and a third subset of the simulation condition data sdata', and the third subset may include fifth input data that corresponds to the image signal processing simulation (e.g., that corresponds to one or more of the first to n-th ISP data Pro_type 1 to Pro_type n).

Although not illustrated in FIG. 3, the simulation condition data sdata' may further include configuration types based on user inputs with respect to simulation items including the presence or absence of pixel pattern and remosaic.

The client 210 may selectively perform pixel pattern simulation based on user input with respect to the pixel pattern. The pixel pattern may include a Bayer pattern of the raw image data. However, the pixel pattern is not limited thereto.

The client 210 may selectively perform a re-mosaic simulation based on a user input on whether or not re-mosaic is performed. The re-mosaic simulation may mean simulation of outputting image data in a binning pattern or outputting image data in a re-mosaic pattern.

In operation S430, the client 210 may generate the image data rdata' based on the image signal processing simulation result. The image data rdata' may be one of PNG, BMP, or JPG formats. In some embodiments, performing the image signal processing simulation may include generating the image data rdata' based on the raw image data rdata and the fifth input data.

In operation S440, the client 210 may perform an image quality assessment (IQA) simulation operation based on the simulation condition data sdata' in which the user input is reflected and the image data rdata'. In some embodiments, the image quality assessment simulation may be performed based on the image data rdata' and a fourth subset of the simulation condition data sdata', and the fourth subset may include sixth input data that corresponds to the image quality assessment operation (e.g., that corresponds to one or more of the first to n-th IQA data An_type 1 to An_type n). For example, the client 210 may perform the image quality assessment simulation based on the image data rdata' and the sixth input data.

As described in FIG. 3, the simulation condition data sdata' may include at least one IQA data. At least one piece of IQA data may include information on resolution assessment and color sharpness assessment.

For example, the image quality assessment simulation may be performed based on a color sharpness assessment item in which a user input is reflected when modeling of image and/or video data is included in the simulation condition data sdata'.

The image quality assessment simulation may be performed based on a resolution assessment item in which a user input is reflected when modeling of chart data is included in the simulation condition data sdata'.

In operation S450, the client 210 may generate the image quality assessment data rdata" based on the image quality assessment simulation result. The client 210 may transmit the image quality assessment data rdata" to the external device 20 (or 10). The image quality assessment data rdata" may be expressed as a quadratic curve or a linear graph.

According to some embodiments of the present disclosure, a virtual image quality assessment system and method of operating the system may perform virtual image quality assessment on image data by selectively performing a simulation based on a user input, regardless of whether a real object camera and an image quality capturing laboratory are provided. Accordingly, performance of the actual image sensor and camera module may be improved based on the image quality assessment result of the image data.

As used herein, the terms "comprises", "comprising", "includes", "including", "has", "having" and any other variations thereof specify the presence of the stated features, steps, operations, elements, and/or components, but do not preclude the presence or addition of one or more other features, integers, steps, operations, elements, components, and/or groups thereof.

The above descriptions are example embodiments for carrying out the present disclosure. Embodiments in which a design is changed simply or which are easily changed may be included in the present disclosure as well as the example embodiments described above. In addition, technologies that are easily changed and implemented by using the above embodiments may be included in the present disclosure. While the present disclosure has been described with reference to example embodiments thereof, it will be apparent to those of ordinary skill in the art that various changes and modifications may be made thereto without departing from the scope of the present disclosure as set forth in the following claims.

What is claimed is:

1. A virtual image quality assessment system comprising:
an electronic device configured to:
receive simulation condition data based on a user input;
perform an optical simulation based on the simulation condition data;
perform a sensor simulation based on the simulation condition data and a result of the optical simulation;
generate, based on a result of the sensor simulation, raw image data representative of data output from an image sensor; and
perform an image quality assessment simulation based on the raw image data generated based on the result of the sensor simulation.

2. The virtual image quality assessment system of claim 1, wherein the electronic device comprises:
a random access memory (RAM) configured to store the simulation condition data;
at least one processor configured to:
perform the optical simulation and the sensor simulation; and receive the simulation condition data from the RAM and to control at least one operation of the optical simulation or the sensor simulation based on the simulation condition data.

3. The virtual image quality assessment system of claim 1, wherein the optical simulation is performed based on a first subset of the simulation condition data, the first subset comprising first input data that corresponds to a virtual reality scene, and wherein the optical simulation comprises modeling the virtual reality scene.

4. The virtual image quality assessment system of claim 3, wherein the first subset of the simulation condition data further comprises second input data that corresponds to a lens and third input data that corresponds to a virtual light source, and wherein, when the first input data is three-dimensional data, the electronic device is further configured to operate in a first operation mode that comprises modeling the virtual reality scene in three dimensions based on the second input data, the third input data, and a lens design value.

5. The virtual image quality assessment system of claim 4, wherein, when the first input data is two-dimensional data, the electronic device is further configured to operate in a second operation mode that comprises modeling the virtual reality scene in two dimensions based on the second input data, the third input data, and lens effect data.

6. The virtual image quality assessment system of claim 5, wherein first photon data is generated as a result of the first operation mode and second photon data is generated as a result of the second operation mode, and wherein the first photon data is the same as the second photon data.

7. The virtual image quality assessment system of claim 5, wherein the sensor simulation is performed based on the result of the optical simulation and a second subset of the simulation condition data, the second subset comprising fourth input data that corresponds to the image sensor.

8. The virtual image quality assessment system of claim 7, wherein the sensor simulation comprises generating the raw image data representative of data output from the image sensor by performing a pixel simulation, a noise simulation, and a digital signal output simulation based on the fourth input data and first photon data generated as a result of the first operation mode.

9. The virtual image quality assessment system of claim 7, wherein the sensor simulation comprises generating the raw image data representative of data output from the image sensor by performing a pixel simulation, a noise simulation, and a digital signal output simulation based on the fourth input data and second photon data generated as a result of the second operation mode.

10. A method for simulating a virtual image quality assessment with respect to a virtual reality scene, the method comprising:

generating, by a metaverse implemented by at least one processor, simulation condition data based on a user input;

performing, by the metaverse implemented by the at least one processor, an optical simulation based on the simulation condition data;

generating, by the metaverse implemented by the at least one processor, by performing a sensor simulation based on the simulation condition data and a result of the optical simulation, raw image data representative of data output from an image sensor;

performing, by the metaverse implemented by the at least one processor, an image signal processing simulation based on the simulation condition data and the raw image data; and performing, by the metaverse implemented by the at least one processor, an image quality assessment simulation based on the simulation condition data and image data generated as a result of the image signal processing simulation.

11. The method of claim 10, wherein the performing of the optical simulation is based on a first subset of the simulation condition data, the first subset comprising first input data corresponding to the virtual reality scene, and wherein the performing of the optical simulation comprises modeling the virtual reality scene.

12. The method of claim 11, wherein the first subset of the simulation condition data further comprises second input data corresponding to a lens and third input data corresponding to a virtual light source, and wherein, when the first input data is three-dimensional data, the modeling of the virtual reality scene comprises modeling, in a first operation mode, the virtual reality scene in three dimensions based on the second input data, the third input data, and a lens design value.

13. The method of claim 12, wherein, when the first input data is two-dimensional data, the modeling of the virtual reality scene comprises modeling, in a second operation mode, the virtual reality scene in two dimensions based on the second input data, the third input data, and lens effect data.

14. The method of claim 13, wherein the performing of the sensor simulation is based on the result of the optical simulation and a second subset of the simulation condition data, the second subset comprising fourth input data corresponding to the image sensor, and wherein the generating of the raw image data representative of data output from the image sensor comprises performing a pixel simulation, a noise simulation, and a digital signal output simulation based on the fourth input data and first photon data generated as a result of the first operation mode.

15. The method of claim 13, wherein the performing of the sensor simulation is based on the result of the optical simulation and a second subset of the simulation condition data, the second subset comprising fourth input data corresponding to the image sensor, and wherein the generating of the raw image data representative of data output from the image sensor comprises performing a pixel simulation, a noise simulation, and a digital signal output simulation based on the fourth input data and second photon data generated as a result of the second operation mode.

16. The method of claim 10, wherein the performing of the image signal processing simulation is based on the raw image data and a third subset of the simulation condition data, the third subset comprising fifth input data corresponding to the image signal processing simulation, and wherein the performing of the image signal processing simulation comprises generating the image data based on the raw image data and the fifth input data.

17. The method of claim 10, wherein the performing of the image quality assessment simulation is based on the image data and a fourth subset of the simulation condition data, the fourth subset comprising sixth input data corresponding to the image quality assessment simulation, and wherein the metaverse performs the image quality assessment simulation based on the image data and the sixth input data.

18. A virtual image quality assessment system comprising:

a metaverse implemented by at least one processor, the metaverse configured to generate simulation condition data based on a user input, the metaverse configured to:

receive the simulation condition data based on the user input;

perform an optical simulation and a sensor simulation based on the simulation condition data; and generate, based on a result of the optical simulation and the sensor simulation, raw image data representative of data output from an image sensor, wherein the metaverse is further configured to perform an image signal processing simulation and an image quality assessment simulation with respect to the raw image data.

19. The virtual image quality assessment system of claim 18, wherein the simulation condition data comprises first input data that corresponds to a virtual reality scene, second input data that corresponds to a lens, and third input data that corresponds to a virtual light source, and wherein the metaverse implemented by the at least one processor is further configured to:

operate in a first operation mode, when the virtual reality scene is three-dimensional charts, that comprises modeling the virtual reality scene in three dimensions based on the second input data, the third input data, and a lens design value; and operate in a second operation mode, when the virtual reality scene is two-dimensional charts, that comprises modeling the virtual reality scene in two dimensions based on the second input data, the third input data, and lens effect data.

20. The virtual image quality assessment system of claim 19, wherein the simulation condition data further comprises fourth input data that corresponds to the image sensor, wherein the sensor simulation comprises generating the raw image data representative of data output from the image sensor by performing a pixel simulation, a noise simulation, and a digital signal output simulation based on the fourth input data and one of first photon data generated as a result of the first operation mode or second photon data generated as a result of the second operation mode, wherein the simulation condition data further comprises fifth input data that corresponds to the image signal processing simulation and sixth input data that corresponds to the image quality assessment simulation, wherein the metaverse performs the image signal processing simulation based on the raw image data and the fifth input data, and wherein the metaverse performs the image quality assessment simulation based on the sixth input data and image data generated as a result of the image signal processing simulation.

* * * * *